United States Patent
Yamaguchi

[15] 3,640,165
[45] Feb. 8, 1972

[54] DEVICE FOR FORMING THE STATOR CORES FOR DYNAMOELECTRIC MACHINES AND ALTERNATING CURRENT MACHINES

[72] Inventor: Terumoto Yamaguchi, Anjo-shi, Japan

[73] Assignee: Nippondenso Kabushiki Kaisha, Kariya-shi, Aichi-ken, Japan

[22] Filed: Dec. 8, 1969

[21] Appl. No.: 883,128

[30] Foreign Application Priority Data

Dec. 26, 1968 Japan................................43/96200

[52] U.S. Cl....................................83/116, 83/345, 83/926
[51] Int. Cl.........................................................B23d 25/12
[58] Field of Search...................83/114, 115, 116, 117, 345, 83/426

[56] References Cited

UNITED STATES PATENTS

| | | | |
|---|---|---|---|
| 215,006 | 5/1879 | Lampert | 83/116 X |
| 1,829,532 | 10/1931 | Olson | 83/345 X |
| 2,546,069 | 3/1951 | Hart | 83/116 |

*Primary Examiner*—James M. Meister
*Attorney*—Cushman, Darby & Cushman

[57] ABSTRACT

A device for forming the stator cores for dynamoelectric machines and alternating machines, comprising a pair of rotary cutter assemblies disposed in axially parallel relation with each other, each of said rotary cutter assemblies comprising a rotary cutter having a plurality of cutter blades arranged around the outer periphery of said rotary cutter in equiangularly spaced relation from each other by an angle corresponding to the pitch of the poles of said core, each of said cutter blades having suitable dimensions, and a plurality of slots formed therein between the adjacent cutter blades, a plurality of plungers slidably fitted into said plurality of slots respectively, a supporting plate disposed within said rotary cutter for holding in position the end portions of said plurality of plungers, and a shaft rotatable about the center of rotation offcentered by a suitable distance from that of said rotary cutter and adapted to rotate said supporting plate in the same direction and at the same angular velocity as those of said rotary cutter, whereby a long continuous strip introduced or fed between said pair of rotary cutter assemblies is cut in the zigzag form in the longitudinal direction and the direction perpendicular relative thereto, thereby forming a plurality of cutting strip each having a series of tooth-shaped poles from a single strip without causing any waste and at a low cost.

2 Claims, 5 Drawing Figures

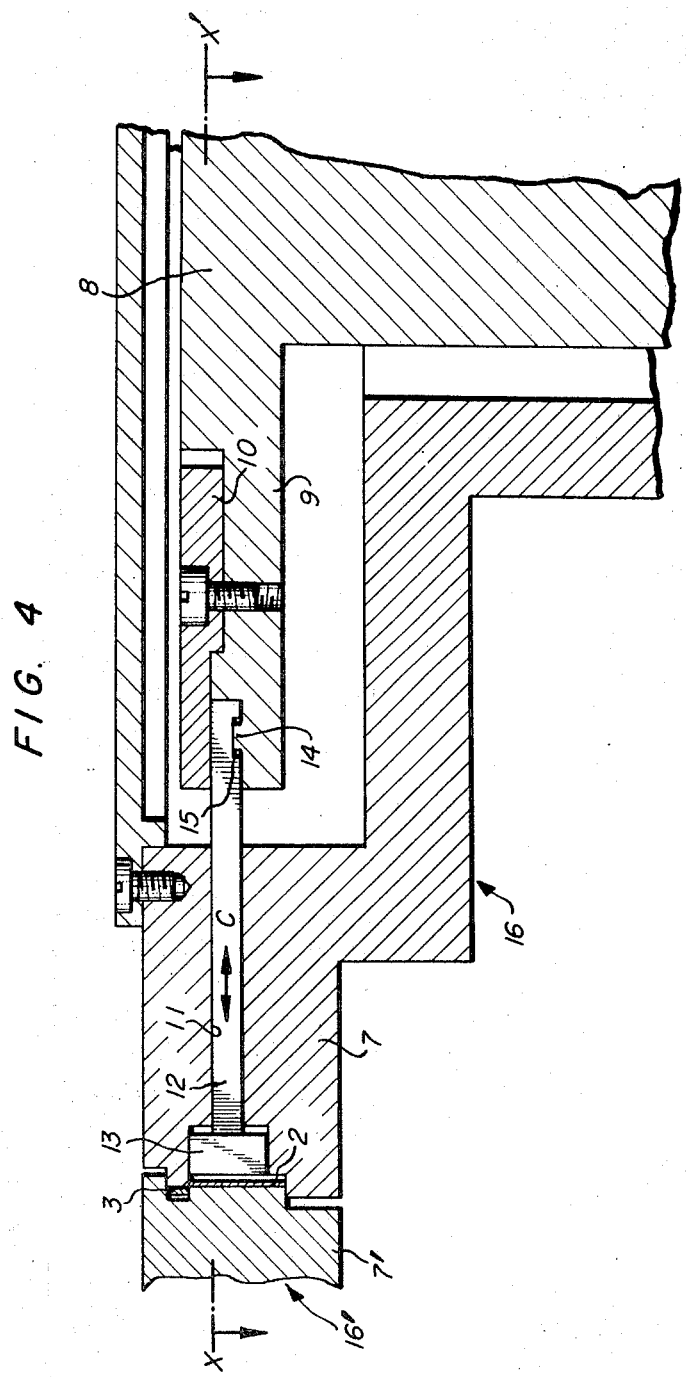

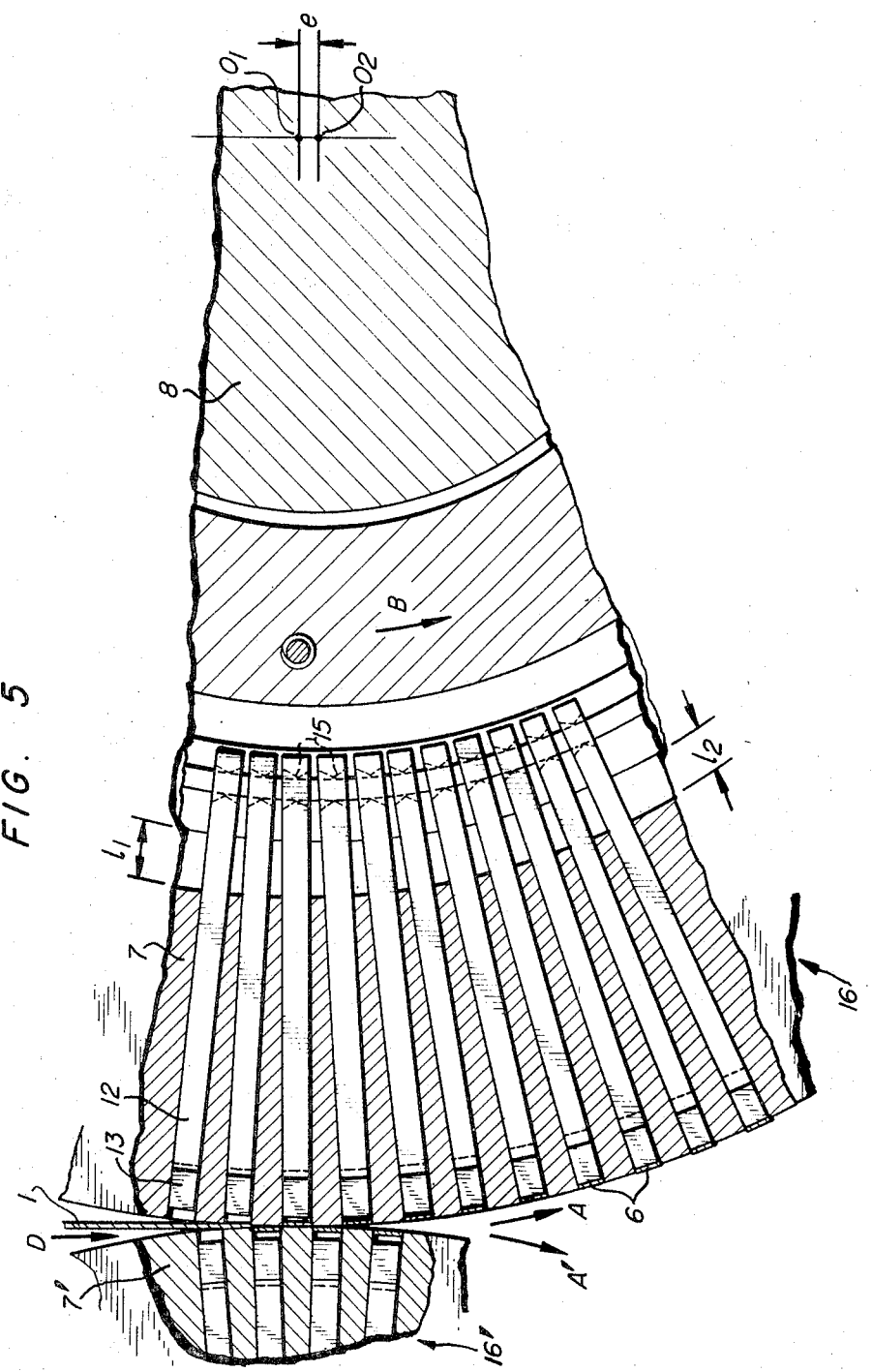

DEVICE FOR FORMING THE STATOR CORES FOR DYNAMOELECTRIC MACHINES AND ALTERNATING CURRENT MACHINES

BACKGROUND OF THE INVENTION

The present invention relates to a device for forming stator cores of dynamoelectric machines and alternating current machines and more particularly a device for forming cores for dynamoelectric machines and alternating current machines which are laminated so as to form a lamination body (generally a stator) consisting of edgewise helically wound strips each turn of which constitutes a lamination plate or core.

There have been known two methods for forming stator cores of dynamoelectric machines alternating current machines. One method is such that each of thin plate is laminated one upon another while the other method is such that helical strips are laminated. In both methods, the materials are wasted, resulting in a considerable material loss and a need for providing a device of the type described above which can form stator cores of dynamoelectric machines and alternating current machines without causing any material loss.

SUMMARY OF THE INVENTION

Accordingly, the primary object of the present invention is to provide a device for forming cores of electrical rotary machines without causing any material loss from a single strip, thereby increasing the productivity and providing inexpensive cores.

In brief, the present invention provides a device for forming cores for electrical rotary machines, comprising a pair of rotary cutter assemblies disposed in axially parallel relation with each other, each of said rotary cutter assemblies comprising a rotary cutter having a plurality of cutter blades arranged around the outer periphery of said rotary cutter in equiangularly spaced relation from each other by an angle corresponding to the pitch of the poles of said cores, each of said cutter blades having suitable dimensions, and a plurality of slots formed therein between the adjacent cutter blades, a plurality of plungers slidably fitted into said plurality of slots respectively, a supporting plate disposed within said rotary cutter for holding in position the end portions of said plurality of plungers, and a shaft rotatable about the center of rotation offcentered by a suitable distance from that of said rotary cutter and adapted to rotate said supporting plate in the same direction and at the same angular velocity as those of said rotary cutter, whereby a long continuous strip introduced or fed between said pair of rotary cutter assemblies is cut in the zigzag form in the longitudinal direction and the direction perpendicular relative thereto, thereby forming a plurality of strips each having a series of tooth-shaped poles from a single strip without causing any material loss.

One of the features of the present invention is that because of the above-described arrangement of the plungers and the supporting plate, the frictional resistance therebetween is very less so that the rotary cutter can rotate at high speed and the strip caught by the cutter blades may be easily released therefrom by the plungers, thus resulting in the highly efficient production of the higher grade and quality cores.

Another remarkable features of the present invention is that the strip is cut by the device of the type described above in the direction perpendicular relative to longitudinal direction and in spaced relation and also cut in the longitudinal direction alternately along the lines connecting the upper and lower ends of the cuts cut in the direction perpendicular relative to the longitudinal direction of said strip, thereby cutting off said strip into strips each having tooth-shaped poles, the material loss can be completely eliminated, thus resulting in low-cost cores for electrical rotary machines. The above and other objects, features and advantages will become more apparent from the following description one illustrative embodiment thereof with reference to the accompanying drawing.

BRIEF DESCRIPTION OF THE DRAWING

FIG. 4 is a fragmentary sectional view illustrating the principal parts of the device of the present invention; and FIG. 5 is a sectional view taken along the line X—X' of FIG. 4.

DESCRIPTION OF THE PREFERRED EMBODIMENT

Figure 1:
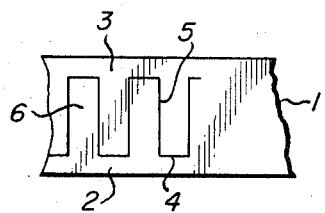
FIG. 1 is a fragmentary plan view of a steel strip used in the present invention.

Referring to the accompanying drawings, reference numeral 1 designates a strip of magnetic material such as iron or silicon steel. By the device as shown in FIGS. 4 and 5, the strip 1 is cut in the direction perpendicular to the longitudinal direction of the strip 1 as shown by reference numeral 5 and also in the longitudinal direction alternately along the lines connecting the upper and lower ends of the vertical cuts 5 as shown by reference numeral 4, so that the strip 1 is divided into two sections or strips 2 and 3 having rectangular teeth 6.

Referring particularly FIGS. 4 and 5, reference numeral 7 designates a rotary cutter having a plurality of cutter blades spaced apart from each other by a distance of the pitch of the teeth of a core for electrical rotary machines, around the outer periphery of the rotary cutter 7. The cutter 7 is rotated about the center $O_1$ in the direction indicated by the arrow A in FIG. 5. A shaft 8 rotates in the direction indicated by the arrow B about the center $O_2$ which is offcentered by a distance $e$ from the center of rotation $O_2$ of the cutter 7. A supporting plate 9 is made integral with the shaft 8 and has a supporting ring 14 over which is fitted a notch 15 formed at the end portion of a pushing rod or plunger 12 slidably fitted into a slot 11. An auxiliary plate 10 serves to stabilize or maintain the engagement between the supporting ring 14 and the plunger 12. The pushing portion 13 formed at the leading end of the plunger 12 has a cross-sectional area larger than that of the sliding portion of the plunger 12 so that the portion 13 may contact with the tooth 6 with a larger area when the strip caught by the rotary cutter 7 is removed.

The above-described rotary cutter 7, the shaft 8, the supporting plate 9, the auxiliary plate 10, holes 11 and plungers 12 constitute a rotary cutter assembly 16. Thus assembled rotary cutter 16 and 16' are arranged in pair so as to be supported by parallel shafts respectively. Reference numeral 7' designates a rotary cutter of the mating rotary cutter assembly 16'.

Next the mode of operation of the device having the construction as described hereinabove will be described. Two rotary cutters 7 and 7' are rotating in the directions indicated by the arrows A and A' respectively and the strip 1 is inserted or fed between them from the direction indicated by the arrow D so that the strip 1 is cut as shown be 4 and 5 in FIG. 1 and then cut off into two sections or strips 3 and 4 which are wrapped over the rotary cutters 7 and 7' respectively. In this case, the supporting plate 9 rotates in the direction indicated by the arrow B about the center of rotation $O_2$ offcentered from the center $O_1$ by a distance $e$ at an angular velocity same as that of the rotary cutter 7. Therefore, the distance $l_1$ is reduced as it approaches to $l_2$ and becomes the minimum when $l_1$ reaches the line connecting the centers $O_1$ and $O_2$. Thus, it is seen that the plungers 12 are caused to slide reciprocably in the slots 11 as shown by the double-pointed arrow C so that the strip section 2 wrapped over the rotary cutter 7 is released therefrom by the plunger 12. The same is true for the rotary cutter assembly 16'.

Figure 2:
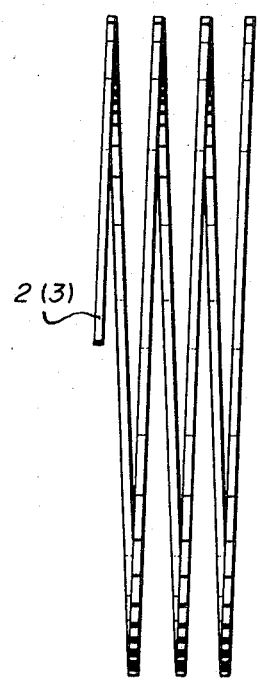
FIG. 2 is a fragmentary side view of the strips cut off in the configuration as shown in FIG. 1 and formed into helical strips.
Figure 3:
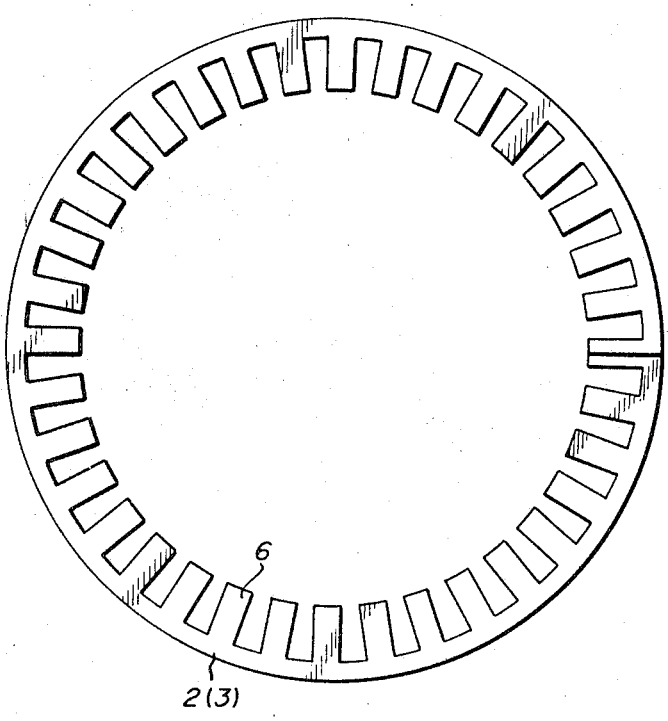
FIG. 3 is a front view thereof.

Thus cut strips may be formed into a edgewise helically wound strip as shown in FIGS. 2 and 3 by the device disclosed by U.S. Pat. No. 3,425,569, granted to the same applicant.

The present invention is most advantageous in the production of laminated cores for electrical rotary machines of the type in which the laminated cores are consisting of edgewise helically wound strips each turn of which constitutes a lamination member. That is, the strips cut and divided by the device described above are further cut off into pieces while being wound into a shaped of a required core of an electrical rotary machine and thus cut and round pieces are laminated one upon another, thereby providing a laminated core.

The present invention has been so far described with particular reference to one illustrative embodiment thereof, but it is understood that variations and modifications can be effected without departing the true spirit of the present invention as described hereinabove and as defined in the appended claims.

What is claimed is:

1. A strip-cutting-off device comprising a pair of rotary cutter assemblies disposed in axially parallel relation with each other, each of said rotary cutter assemblies comprising
   1. a rotary cutter having a plurality of cutter blades arranged around the outer periphery of said rotary cutter and each having suitable dimensions, and slots formed between the adjacent cutter blades,
   2. a plurality of plungers slidably fitted into said slots,
   3. a supporting plate disposed in said rotary cutter for holding in position the end portions of said plurality of plungers, said plungers each being provided at one end thereof with a notch, the both sides of which are tapered toward the center of the notch so that the width of the notch decreases toward the center thereof, said supporting plate being provided with a projection which is slidably received in said notch, and
   4. a shaft rotatable about the center of rotation which is offcentered by a suitable distance from the center of rotation of said rotary cutter and is adapted to rotate said supporting plate in the same direction and at the same angular velocity as those of said rotary cutter,
   whereby the strip introduced between said pair of rotary cutter assemblies is cut off in the longitudinal direction thereof.

2. A device for forming stator cores for electrical rotary machines comprising a pair of rotary cutter assemblies disposed in axially parallel relation with each other, each of said rotary cutter assemblies comprising
   1. a rotary cutter having a plurality of cutter blades arranged around the outer periphery of said rotary cutter in equiangularly spaced relation with each other by an angle corresponding to the pitch of the poles of said cores, each of said cutter blades having suitable dimensions, and
   a plurality of slots formed between the adjacent cutter blades,
   2. a plurality of plungers slidably fitted into said plurality of slots respectively,
   3. a supporting plate disposed in said rotary cutter for holding in position the end portions of said plurality of plungers, said plungers each being provided at one end thereof with a notch, the both sides of which are tapered toward the center of the notch so that the width of the notch decreases toward the center thereof, said supporting plate being provided with a projection which is slidably received in said notch, and
   4. a shaft rotatable about the center of rotation offcentered by a suitable distance from the center of rotation of said rotary cutter and adapted to rotate said supporting plate in the same direction and at the same angular velocity as those of said rotary cutter,
   whereby the strip introduced between said paid of rotary cutter assemblies is cut in the direction perpendicular to the longitudinal direction thereof and in spaced-apart relation by a suitable distance and also cut in the longitudinal direction thereof alternately along the line connecting the upper ends of the two adjacent cuts in the direction perpendicular relative to the longitudinal direction of said blank and along the line connecting the lower ends of the two adjacent cuts in the direction perpendicular relative to the longitudinal direction of said strip, thereby cutting off said strip into two strips each having the tooth-shaped poles.

* * * * *